(12) United States Patent
Oshie et al.

(10) Patent No.: US 9,182,006 B2
(45) Date of Patent: Nov. 10, 2015

(54) HYDRAULIC SHOCK ABSORBER AND VALVE

(71) Applicant: SHOWA CORPORATION, Gyoda (JP)

(72) Inventors: Yuki Oshie, Gyoda (JP); Noriyuki Itsubo, Gyoda (JP); Yasuyuki Tanabe, Gyoda (JP)

(73) Assignee: SHOWA CORPORATION, Gyoda, Saitama (JP)

( * ) Notice: Subject to any disclaimer, the term of this patent is extended or adjusted under 35 U.S.C. 154(b) by 174 days.

(21) Appl. No.: 13/801,611

(22) Filed: Mar. 13, 2013

(65) Prior Publication Data

US 2014/0060985 A1    Mar. 6, 2014

(30) Foreign Application Priority Data

Aug. 31, 2012  (JP) .................................. 2012-191259

(51) Int. Cl.
*F16F 9/50* (2006.01)
*F16F 9/516* (2006.01)
*F16F 9/348* (2006.01)

(52) U.S. Cl.
CPC .............. *F16F 9/5165* (2013.01); *F16F 9/348* (2013.01); *F16F 9/3484* (2013.01); *F16F 9/516* (2013.01)

(58) Field of Classification Search
CPC ....... F16F 9/348; F16F 9/3481; F16F 9/3482; F16F 9/3484; F16F 9/3485; F16F 9/3487; F16F 9/3488
USPC ........ 188/282.1, 282.5, 282.6, 283, 285, 288, 188/317, 322.13, 322.14, 322.15, 322.22
See application file for complete search history.

(56) References Cited

U.S. PATENT DOCUMENTS

| | | | | |
|---|---|---|---|---|
| 3,991,862 A | * | 11/1976 | Tanabe | 188/282.6 |
| 4,512,447 A | * | 4/1985 | Miura | 188/282.6 |
| 5,529,154 A | * | 6/1996 | Tanaka | 188/282.6 |
| 8,517,153 B2 | * | 8/2013 | Baltes | 188/282.6 |

(Continued)

FOREIGN PATENT DOCUMENTS

| | | |
|---|---|---|
| JP | S61-040534 U | 3/1986 |
| JP | S61-089535 | 6/1986 |
| JP | H07-038778 U | 7/1995 |

(Continued)

OTHER PUBLICATIONS

English-language abstract of JP 2008-281114 (no date).*

(Continued)

*Primary Examiner* — Nicholas J Lane
(74) *Attorney, Agent, or Firm* — Leason Ellis LLP (57) ABSTRACT

A hydraulic shock absorber includes a valve body having a second valve which is fixed to the valve body on a central axis CL side of the second valve and covers an open end of a second oil passage in the valve body. The second valve is deformable in a direction away from the valve body when the valve is applied with force from the valve body side. The second valve is configured: (a) to include a first through-hole formed in a circumferential direction thereof, (b) have lower stiffness, with respect to force from the valve body side, on a second through-hole side than on a third through-hole side and (c) such that a first corner portion C1 of the first through-hole has higher stiffness than a second corner portion C2 of the first through-hole positioned on the third through-hole side.

4 Claims, 6 Drawing Sheets

(56) References Cited

U.S. PATENT DOCUMENTS

2006/0225976 A1* 10/2006 Nakadate .................. 188/266
2009/0260938 A1* 10/2009 Hikosaka ................ 188/322.15

FOREIGN PATENT DOCUMENTS

| JP | 2008-014302 A | 1/1996 |
| JP | 2008-248956 A | 10/2008 |
| JP | 2008281114 A * | 11/2008 |

OTHER PUBLICATIONS

Machine translation of JP 2008-014302 (no date).*

* cited by examiner

HYDRAULIC SHOCK ABSORBER AND VALVE

CROSS REFERENCE TO RELATED APPLICATIONS

This application is based on and claims priority under 35 USC §119 from Japanese Patent Application No. 2012-191259 filed Aug. 31, 2012.

BACKGROUND OF THE INVENTION

1. Field of the Invention

The present invention relates to a hydraulic shock absorber and a valve.

2. Description of the Related Art

A suspension apparatus in a vehicle such as an automobile includes a hydraulic shock absorber with a damping force generator in order to appropriately reduce vibration transmitted from a road surface to a vehicle body during traveling, thus improving ride comfort and steering stability.

For example, a valve structure in a hydraulic shock absorber described in Japanese Patent Application Laid-Open No. H8-14302 is configured as follows. Two through-holes are formed in a tension side base valve and have different opening areas. Thus, the tension side base valve has nonuniform stiffness in a circumferential direction thereof.

Patent Document: Japanese Patent Application Laid-Open No. H8-14302

SUMMARY OF THE INVENTION

If the valve has nonuniform stiffness in the circumferential direction, a low-stiffness area of the valve is deflected more significantly than a high-stiffness area of the valve. Thus, the low-stiffness area of the valve may be damaged, degrading the durability of the valve.

An object of the present invention is to improve the durability of a valve with a high-stiffness area and a low-stiffness area.

To accomplish this object, an aspect of the present invention provides a hydraulic shock absorber including: a partitioning member which partitions a closed space and having a passage through which the closed space is continuous with an outside; and a valve which is a member fixed to the partitioning member on a central side of the valve and covering an open end of the passage in the partitioning member, the valve being deformable in a direction away from the partitioning member when the valve is applied with force from the partitioning member side, and the valve being configured to have a through-hole formed in a circumferential direction thereof and having lower stiffness with respect to the force exerted from the partitioning member side on one side of the through-hole than on another side of the through-hole relative to a virtual center line connecting a circumferential center of the through-hole with a central axis of the valve, wherein the valve is configured in such a manner that a first end portion of the through-hole positioned on the one side of the through-hole has higher stiffness than a second end portion of the through-hole positioned on the another side of the through-hole.

Here, the valve is configured in such a manner that the first end portion of the through-hole has a larger radius of curvature than the second end portion of the through-hole.

Furthermore, the through-hole in the valve may have a first corner portion and a second corner portion positioned closer to a center of the valve than the first corner portion and having lower stiffness than the first corner portion.

Additionally, the valve may include a first slot formed on the one side in the circumferential direction and a second slot formed on the another side in the circumferential direction and having a smaller circumferential length than the first slot.

In addition, the valve starts to be deflected at an area with the through-hole formed therein when the valve is pushed by a liquid flowing through the passage in the partitioning member.

In another aspect, the present invention provides a hydraulic shock absorber including: a partitioning member which partitions a closed space and has a passage through which the closed space is continuous with an outside; and a valve which is a member fixed to the partitioning member on a central side of the valve and covering an open end of the passage in the partitioning member, the valve being deformable in a direction away from the partitioning member when the valve is applied with force from the partitioning member side, and the valve being configured to have a through-hole formed in a circumferential direction thereof, wherein the through-hole in the valve comprises a first corner portion and a second corner portion positioned closer to a center of the valve than the first corner portion and having a smaller radius of curvature than the first corner portion.

In another aspect, the present invention provides a valve which is a member fixed on a central side thereof to a partitioning member which partitions a closed space and has a passage through which the closed space is continuous with an outside, the valve being configured to cover an open end of the passage in the partitioning member and being deformable in a direction away from the partitioning member when the valve is applied with force from the partitioning member side, and the valve being configured to have a through-hole formed in a circumferential direction thereof and to have lower stiffness with respect to the force exerted from the partitioning member side on one side of the through-hole than on another side of the through-hole relative to a virtual center line connecting a circumferential center of the through-hole with a central axis of the valve, wherein a first end portion of the through-hole positioned on one side of the through-hole has higher stiffness than a second end portion of the through-hole positioned on the another side of the through-hole.

The present invention can improve the durability of a valve with a high-stiffness area and a low-stiffness area.

DESCRIPTION OF THE PREFERRED EMBODIMENTS

An embodiment of the present invention will be described below with reference to the attached drawings.

<Hydraulic Shock Absorber 100>

Figure 1:
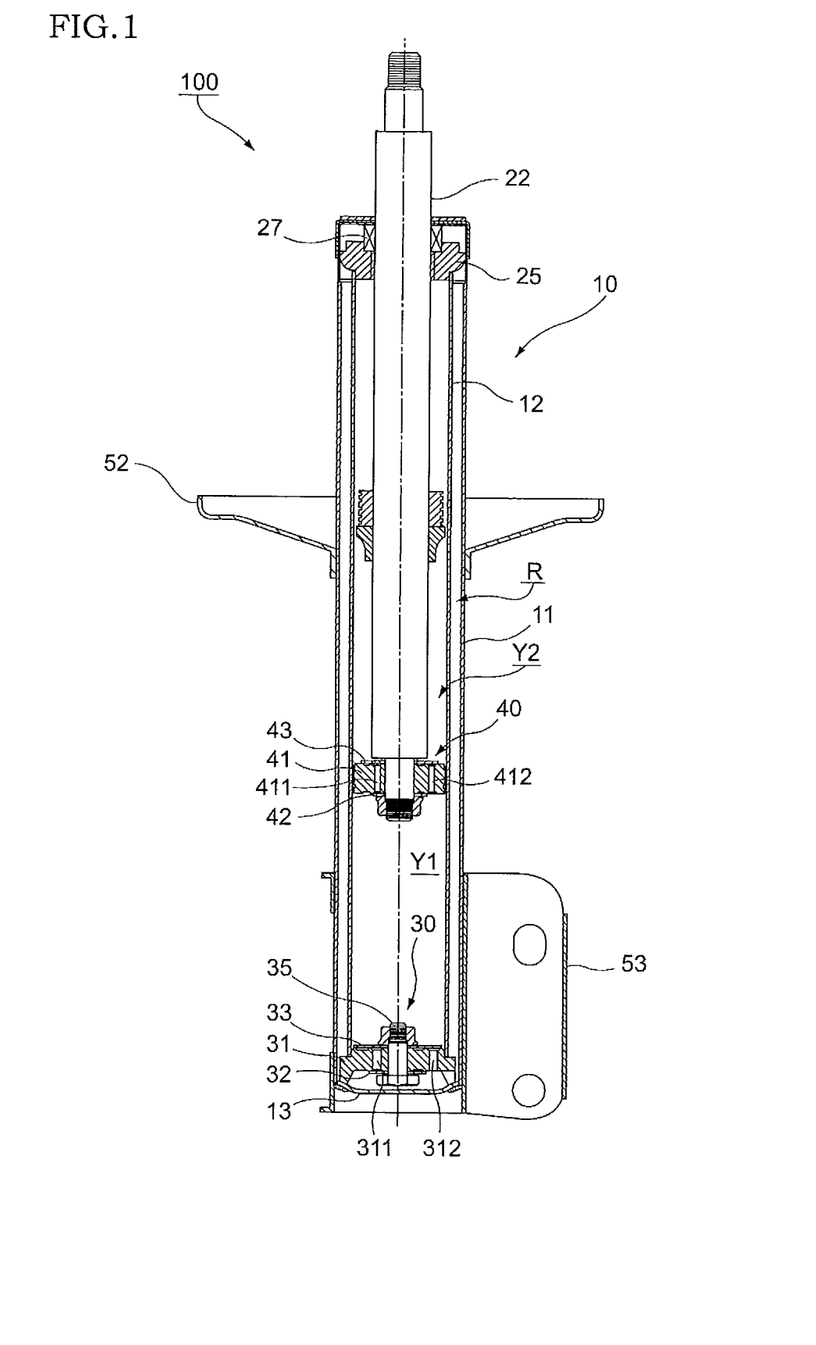
FIG. 1 is a diagram showing a general configuration of a hydraulic shock absorber according to the present embodiment.

FIG. 1 is a diagram showing a general configuration of a hydraulic shock absorber 100 according to the present embodiment. The hydraulic shock absorber 100 according to the present embodiment is of a multi-tube type and forms a part of a strut suspension.

As shown in FIG. 1, the hydraulic shock absorber 100 includes a cylinder 10 with an outer cylinder 11 shaped like a thin cylinder, an inner cylinder 12 shaped like a thin cylinder and contained in the outer cylinder 11, and a bottom cover 13 covering a first end portion of the cylindrical outer cylinder 11 in an axial direction of the cylinder (the up-down direction in FIG. 1). The axial direction of the outer cylinder 11 is hereinafter simply referred to as the "axial direction".

Furthermore, the hydraulic shock absorber 100 includes a piston 41 arranged so as to be movable through the inner cylinder 12 in the axial direction, a piston rod 22 arranged along the axial direction to support the piston 41 at a first axial end portion (in FIG. 1, a lower end portion) of the piston rod 22, a rod guide 25 arranged inside the outer cylinder 11 to guide the piston rod 22, and an oil seal 27 provided opposite the piston 41 with respect to the rod guide 25 to prevent leakage of a liquid from inside the cylinder 10 and mixture of foreign matter into the cylinder 10.

The hydraulic shock absorber 100 further includes a first valve apparatus 30 arranged at a first axial end portion of the inner cylinder 12, a second valve apparatus 40 arranged at a first axial end portion of the piston rod 22, a bracket 53 allowing the hydraulic shock absorber 100 to be connected to a knuckle (not shown in the drawings) of a wheel to which the hydraulic shock absorber 100 is attached, an upper spring sheet (not shown in the drawings) attached to a second axial end portion (in FIG. 1, an upper end portion) of the piston rod 22, and a lower spring sheet 52 supporting a spring (not shown in the drawings) together with the upper spring sheet.

<Hydraulic 100>

Here, the piston 41 contacts an inner periphery of the inner cylinder 12 to partition a space in the inner cylinder 12 in which a liquid (in the present embodiment, oil) is sealed into a first oil chamber Y1 located closer to the first axial end portion of the inner cylinder 12 than the piston 41 and a second oil chamber Y2 located closer to a second axial end portion of the inner cylinder 12 than the piston 41.

Moreover, in the hydraulic shock absorber 100 according to the present embodiment, an outer periphery of the inner cylinder 12 and an inner periphery of the outer cylinder 11 form a reservoir chamber R. Although not shown in the drawings, the inside of the reservoir chamber R is partitioned into an oil chamber in which oil is sealed and a gas chamber in which air, an inert gas, or the like is sealed. As shown in FIG. 1, the first valve apparatus 30 defines the reservoir chamber R and the first oil chamber Y1, which are chambers are examples of spaces closed by a valve body 31 described below.

The first valve apparatus 30 includes the valve body 31 which is a cylindrical member with a first oil passage 311 and a second oil passage 312 both formed in the axial direction. Furthermore, the first valve apparatus 30 includes a first valve 32 which closes a first axial end portion of the first oil passage 311 formed in the valve body 31, a second valve 33 (described below) which closes a second axial end portion of the second oil passage 312 formed in the valve body 31, and a bolt and nut 35 which fixes the first valve 32 and the second valve 33 to the valve body 31.

The second valve apparatus 40 includes the above-described piston 41. Here, the piston 41 has a first oil passage 411 and a second oil passage 412 both formed in the axial direction. Furthermore, the second valve apparatus 40 includes a first valve 42 which closes a first axial end portion of the first oil passage 411 formed in the piston 41, a second valve 43 which closes a second axial end portion of the second oil passage 412 formed in the piston 41.

Next, the operation of the hydraulic shock absorber 100 configured as described above will be described.

First, the operation of the hydraulic shock absorber 100 during a compression stroke will be described.

Figure 2:
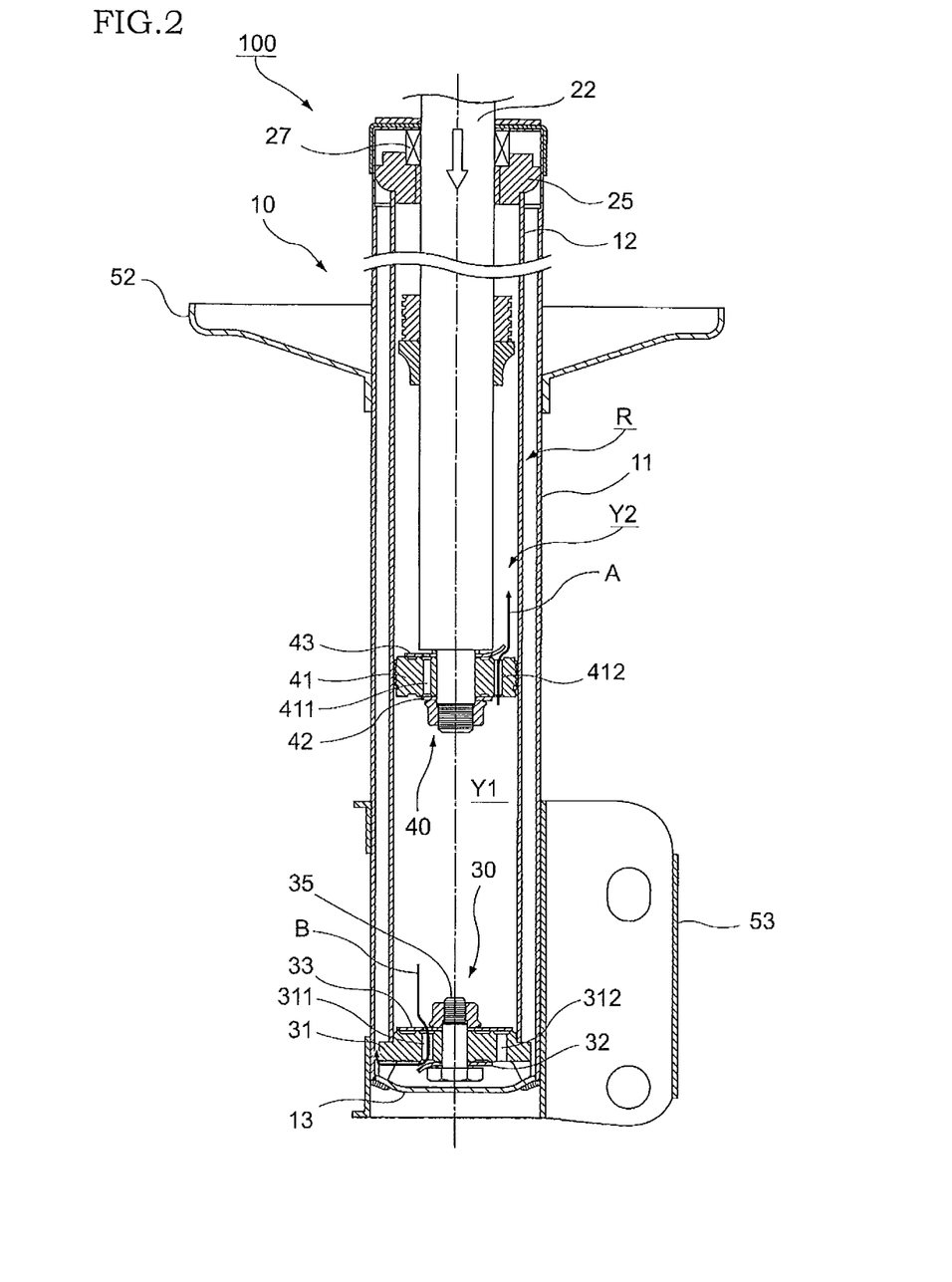
FIG. 2 is a diagram showing a flow of oil during a compression stroke of the hydraulic shock absorber.

FIG. 2 is a diagram showing a flow of oil during the compression stroke of the hydraulic shock absorber 100.

When the piston rod 22 moves toward the first axial end portion side thereof (in FIG. 2, downward) with respect to the cylinder 10 as shown by a blank arrow, the movement of the piston 41 elevates the pressure in the first oil chamber Y1. The oil in the first oil chamber Y1 opens the second valve 43 blocking the second oil passage 412 in the second valve apparatus 40 and flows into the second oil chamber Y2, located above the second valve apparatus 40 (see arrow A). The flow of the oil from the first oil chamber Y1 to the second oil chamber Y2 is throttled by the first oil passage 412 and the second valve 43. This exerts a damping force for the compression stroke of the hydraulic shock absorber 100.

Furthermore, the oil in the first oil chamber Y1 opens the first valve 32 blocking the first oil passage 311 and flows into the reservoir chamber R, formed between the inner cylinder 12 and the outer cylinder 11 (see arrow B). The flow of the oil from the first oil chamber Y1 to the reservoir chamber R is throttled by the first oil passage 311 and the first valve 32. This exerts a damping force for the compression stroke of the hydraulic shock absorber 100.

Now, the behavior of the hydraulic shock absorber 100 during a tension stroke will be described.

Figure 3:
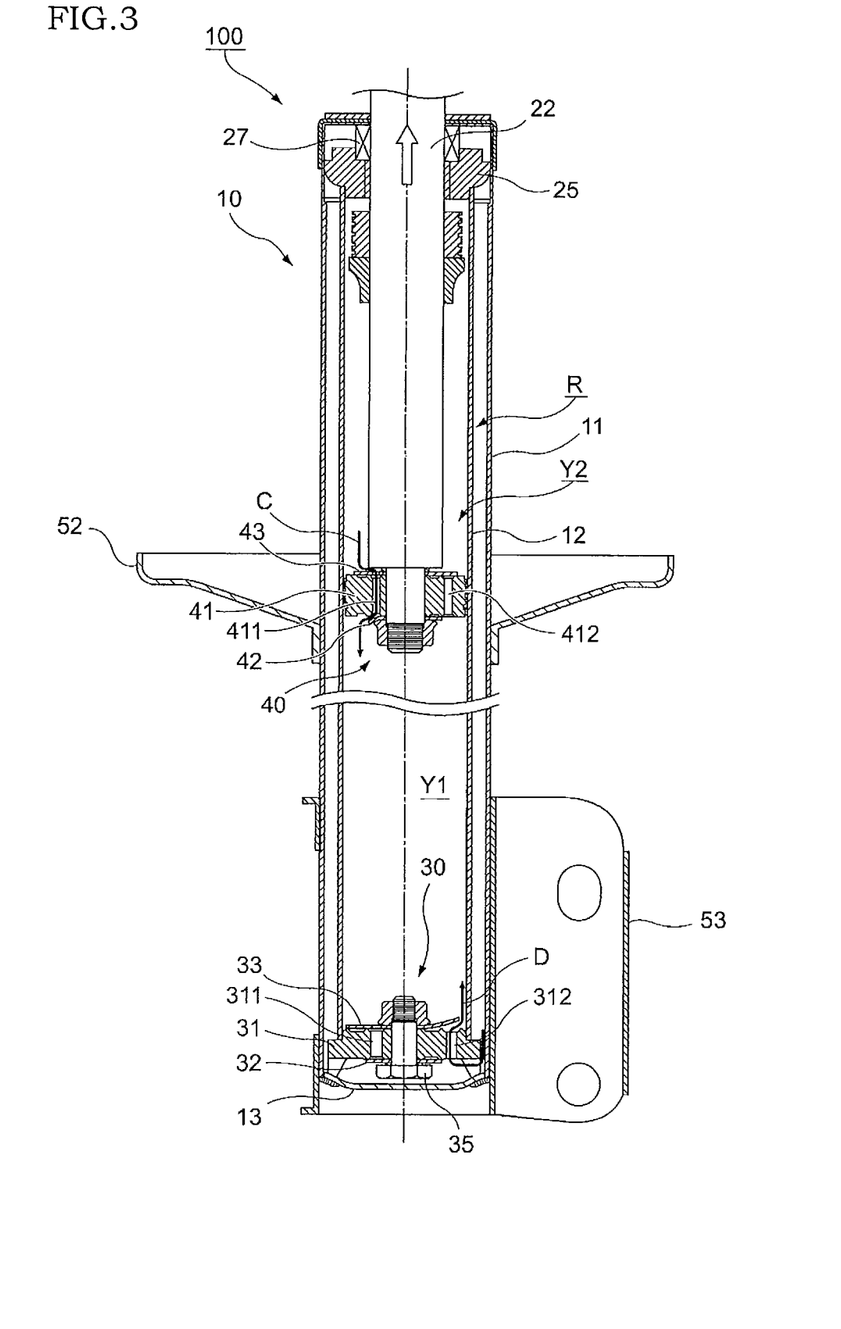
FIG. 3 is a diagram showing a flow of oil during a tension stroke of the hydraulic shock absorber.

FIG. 3 is a diagram showing a flow of oil during the tension stroke of the hydraulic shock absorber 100.

When the piston rod 22 moves toward the second axial end portion side thereof (in FIG. 3, upward) with respect to the cylinder 10 as shown by a blank arrow, the first oil chamber Y1 is short of a corresponding volume of oil and is internally subjected to negative pressure. Thus, the oil in the second oil chamber Y2 opens the first valve 42 blocking the first oil passage 411 in the second valve apparatus 40 and flows into the first oil chamber Y1 (see arrow C). The flow of the oil from the second oil chamber Y2 to the first oil chamber Y1 is throttled by the first oil passage 411 and the first valve 42 in the second valve apparatus 40. This exerts a damping force for the tension stroke of the hydraulic shock absorber 100.

Furthermore, when the piston rod 22 moves toward the second axial end portion side thereof (in FIG. 3, upward) with respect to the cylinder 10, the oil in the reservoir chamber R opens the second valve 33 blocking the second oil passage 312 in the valve body 31 of the first valve apparatus 30 and flows into the first oil passage Y1 (see arrow D). The flow of the oil from the reservoir chamber R to the first oil chamber Y1 is throttled by the second oil passage 312 and the second valve 33 in the first valve apparatus 30. This exerts a damping force for the tension stroke of the hydraulic shock absorber 100.

The hydraulic shock absorber 100 configured as described above absorbs impact force during travel of a vehicle with the hydraulic shock absorber 100 attached thereto.

<Second Valve 33>

Figure 4A:
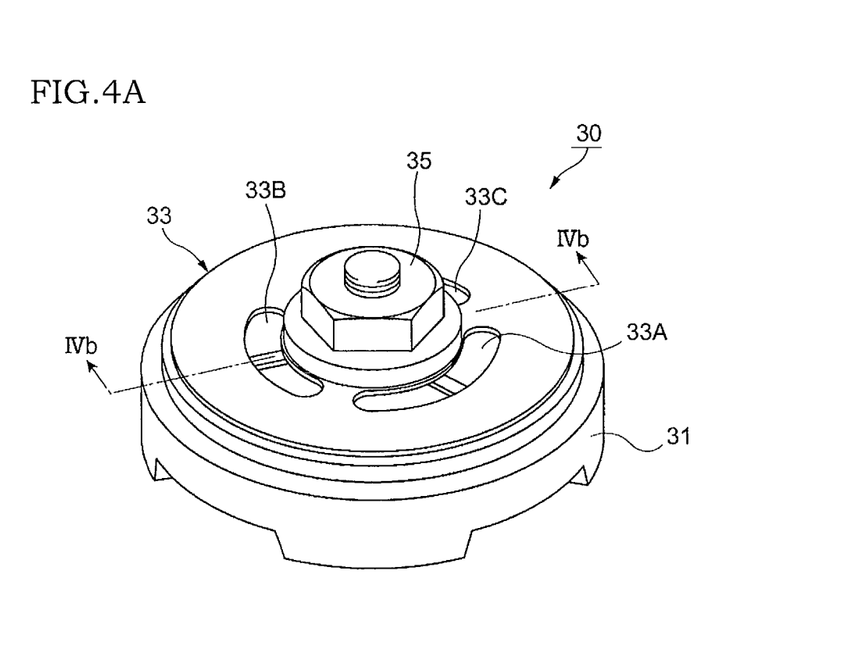
FIGS. 4A and 4B are diagrams showing a general configuration of a first valve apparatus.
Figure 4B:
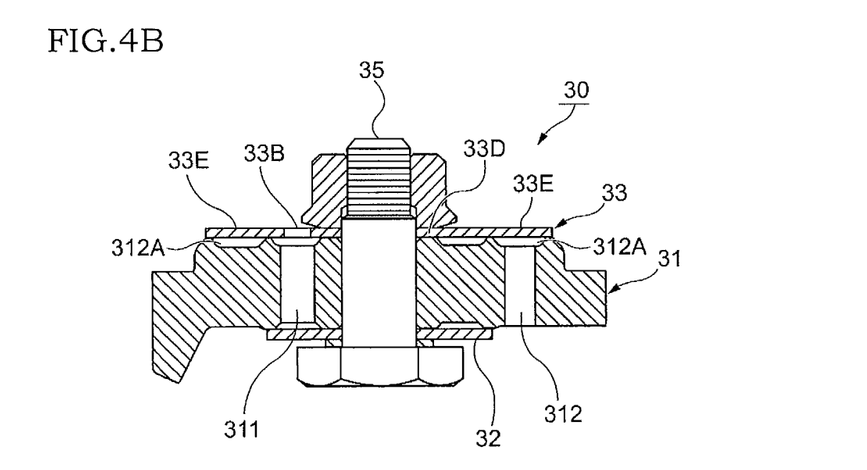

Now, a configuration of the second valve 33 will be described with reference to FIGS. 4A and 4B. FIGS. 4A and 4B are diagrams showing a general configuration of the first valve apparatus 30. More specifically, FIG. 4A is a perspective view of the first valve apparatus 30. FIG. 4B is a cross-sectional view of the first valve apparatus 30 taken along line IVb-IVb in FIG. 4A.

As shown in FIG. 4A, the second valve (check valve) 33 is a generally-disc-shaped elastically deformable member. The second valve 33 is fixed, on a central side thereof, to the valve body (bottom piece) 31, which is an example of a partitioning member, by a bolt and nut 35. Furthermore, the second valve 33 includes a plurality of through-holes, a first through-hole 33A, a second through-hole 33B, and a third through-hole 33C (described below) formed therein.

As shown in FIG. 4B, the second valve 33 is arranged so as to cover the second oil passage 312 formed in the valve body 31. More specifically, an outer annular portion 33E (described below) of the second valve 33 is arranged opposite an open end 312A of the second oil passage 312. Furthermore, the first through-hole 33A, the second through-hole 33B, and the third through-hole 33C are arranged opposite the first oil passage 311 formed in the valve body 31.

During the compression stroke (see FIG. 2) of the hydraulic shock absorber 100, the second valve 33 limits a flow of oil from the first oil chamber Y1 (see FIG. 2) to the second oil passage 312. At this time, the second valve 33 permits a flow of oil from the first oil chamber Y1 (see FIG. 2) to the first oil passage 311 through the first through-hole 33A, the second through-hole 33B, and the third through-hole 33C. Furthermore, during the tension stroke (see FIG. 3) of the hydraulic shock absorber 100, the second valve 33 permits a flow of oil from the second oil passage 312 to the first oil chamber Y1 (see FIG. 3). At this time, the second valve 33 is pushed by the oil flowing out from the second oil passage 312 and deflected in a direction away from the valve body 31.

Figure 5A:
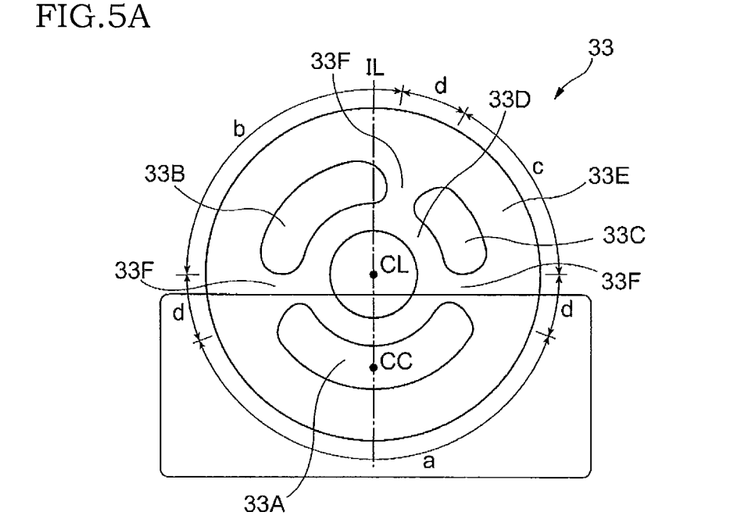
FIGS. 5A and 5B are diagrams showing a general configuration of a second valve.
Figure 5B:
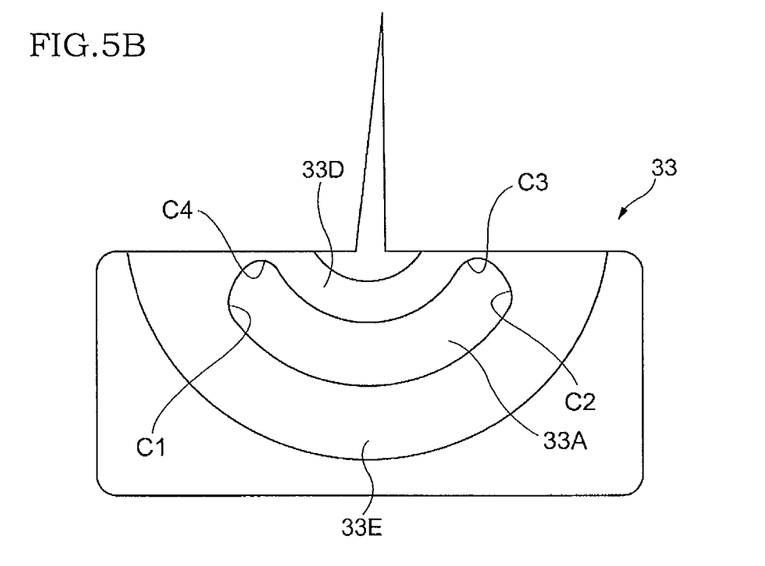

The configuration of the second valve 33 will be described with reference to FIGS. 5A and 5B. FIGS. 5A and 5B are diagrams showing a general configuration of the second valve 33. More specifically, FIG. 5A is a plan view of the second valve 33. FIG. 5B is a diagram showing a general configuration of the first through-hole 33A.

As shown in FIG. 5A, the second valve 33 includes the first through-hole 33A, an example of a through-hole, the second through-hole 33B, an example of a first slot, and the third through-hole 33C, an example of a second slot formed therein. The first through-hole 33A, the second through-hole 33B, and the third through-hole 33C are circular-arc-shaped slots formed along a circumferential direction (peripheral direction) of the second valve 33, and have different circumferential lengths (different opening areas). In the illustrated example, the circumferential length of the through-hole decreases in the following order: the first through-hole 33A, the second through-hole 33B, and the third through-hole 33C. In the illustrated example, the first through-hole 33A, the second through-hole 33B, and the third through-hole 33C are shown as circular-arc-shaped slots. However, the first through-hole 33A, the second through-hole 33B, and the third through-hole 33C may be shaped to extend in a circumferential direction of the second valve 33 and may be shaped like, for example, an ellipse, a rectangle, or a polygon.

Furthermore, the second valve 33 has an inner annular portion 33D fixed to the valve body 31 via the bolt and nut 35 (see FIG. 4A) radially inside the first through-hole 33A, the second through-hole 33B, and the third through-hole 33C, the outer annular portion 33E which can contact and leave the valve body 31 radially outside the first through-hole 33A, the second through-hole 33B, and the third through-hole 33C, and connection portions 33F connecting the inner annular portion 33D and the outer annular portion 33E together in the radial direction. The connection portions 33F are arranged at irregular intervals in the circumferential direction. The second valve 33 has an unevenly distributed shape.

Here, the second valve 33 is configured such that the stiffness of the second valve 33 with respect to force from the valve body 31 varies in the circumferential direction of the second valve 33 because the second valve 33 includes the first through-hole 33A, the second through-hole 33B, and the third through-hole 33C formed therein and which have different circumferential lengths. Specifically, the stiffness of the areas of the second valve 33 increases in the following order: an area with the first through-hole 33A formed therein and having the largest circumferential length (see arrow a), an area with the second through-hole 33B formed therein and having the second largest circumferential length (see arrow b), an area with the third through-hole 33C formed therein and having the smallest circumferential length (see arrow c), and an area with the connection portion 33F formed therein (see arrow d). The likelihood of deflection increases with decreasing stiffness, and thus the outer annular portion 33E in a lower-stiffness area more easily contacts and leaves the valve body 31.

Now, shape of the first through-hole 33A will be described.

First, as shown in FIG. 5B, the first through-hole 33A has four corner portions, a first corner portion C1, a second corner portion C2, a third corner portion C3, and a fourth corner portion C4. Specifically, the first through-hole 33A has the first corner portion C1 positioned on a first circumferential end side (the second through-hole 33B side) and a radially outward side thereof, the second corner portion C2 positioned on a second circumferential end side (the third through-hole 33C side) and the radially outward side thereof, the third corner portion C3 positioned on the second circumferential end side and the radially inward side thereof, and the fourth corner portion C4 positioned on the first circumferential end side and the radially inward side thereof.

The first corner portion C1, the second corner portion C2, the third corner portion C3, and the fourth corner portion C4 are each curved. The first corner portion C1, the second corner portion C2, the third corner portion C3, and the fourth corner portion C4 also have different radii of curvature. The radius of curvature of the corner portion decreases (the curvature increases) in the following order: the first corner portion C1, the second corner portion C2, the third corner portion C3, and the fourth corner portion C4.

More specifically, in the radially outward corner portions, the corner portion closer to the second through-hole 33B in the circumferential direction has a larger radius of curvature than the corner portion closer to the third through-hole 33C in the circumferential direction. That is, the first corner portion C1 has a larger radius of curvature than the second corner portion C2. Furthermore, in the radially inward corner portions, the corner portion closer to the third through-hole 33C in the circumferential direction has a larger radius of curvature than the corner portion closer to the second through-hole 33B in the circumferential direction. That is, the third corner portion C3 has a larger radius of curvature than the fourth corner portion C4.

Furthermore, the radially outward corner portions have a larger radius of curvature than the radially inward corner portions (the other corner portions). That is, the first corner portion C1 has a larger radius of curvature than the fourth corner portion C4. The second corner portion C2 has a larger radius of curvature than the third corner portion C3.

Figure 6A:
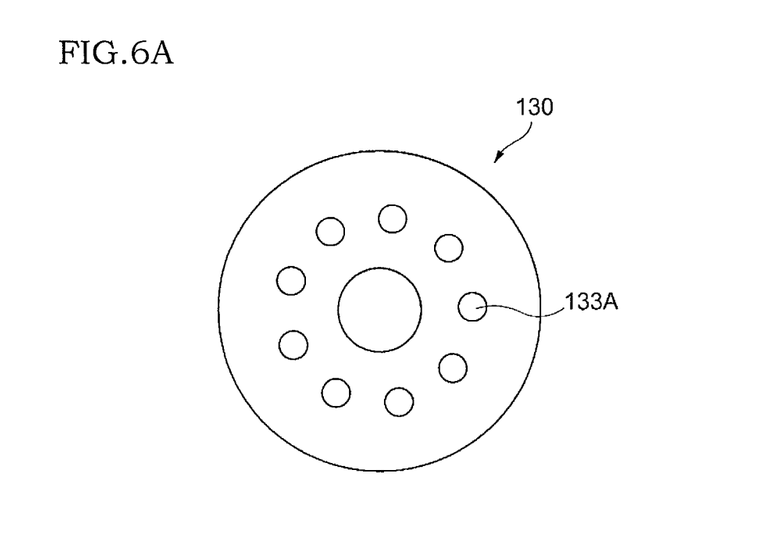
FIGS. 6A and 6B are diagrams of general configurations of second valves in comparative examples which are different from the second valve according to the present embodiment.
Figure 6B:
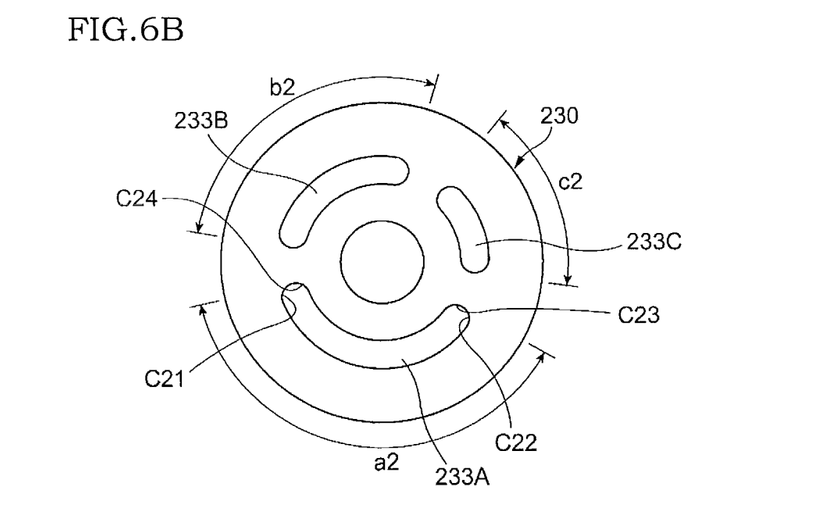

Now, the operation of the second valve 33 configured as described above will be described with reference to FIGS. 4A to FIG. 6B. FIGS. 6A and 6B are diagrams of general configurations of second valves 130 and 230 in comparative examples which are different from the second valve according to the present embodiment.

First, as shown in FIG. 6A, the second valve 130 in the comparative example includes a plurality of (in the illustrated example, nine) round holes 133A formed at predetermined intervals in the circumferential direction of the second valve 130. In addition, the second valve 130 has an evenly distributed shape.

The second valve 33 according to the present embodiment includes the circular arc-shaped first through-hole 33A, second through-hole 33B, and third through-hole 33C formed therein as described above. Thus, the second valve 33 according to the present embodiment has a less stiff area than the second valve 130 in FIG. 6A. Consequently, the second valve 33 is more readily deformed and allows oil to flow more easily through the second oil passage 312 to the first oil chamber Y1 (see FIG. 3) during the tension stroke (see FIG. 3) of the hydraulic shock absorber 100.

Furthermore, the second valve 33 has an unevenly distributed shape as described above and thus has stiffness varying in the circumferential direction. Thus, during the tension stroke (see FIG. 3) of the hydraulic shock absorber 100, the areas of the second valve 33 are deflected in order of increasing stiffness starting with the area with the lowest stiffness. Specifically, the areas of the second valve 33 are deflected in the following order: the area with the first through-hole 33A formed therein (see arrow a), the area with the second through-hole 33B formed therein (see arrow b), the area with the third through-hole 33C formed therein (see arrow c), and the area with the connection portion 33F formed therein (see arrow d). In each of the areas, a channel for oil is formed between the outer annular portion 33E and the second oil passage 312 to which the outer annular portion 33E is opposed (the outer annular portion 33E starts to be opened). Thus, the hydraulic shock absorber 100 including the second valve 33 with the areas thereof opened in order of increasing stiffness has smoother damping force characteristics than, for example, a hydraulic shock absorber including the second valve 130 with an evenly distributed shape.

The second valve 130 in FIG. 6A is stiffer than the second valve 33, and is thus insufficiently deflected as a result of oil flowing through the second oil passage 312 to the first oil chamber Y1 (see FIG. 3) during the tension stroke. This reduces the pressure in the first oil chamber Y1 (see FIG. 3).

Furthermore, the second valve 33 includes the circular arc-shaped first through-hole 33A, second through-hole 33B, and third through-hole 33C, and has a larger opening area for the first oil passage 311 in the second valve 33 (see FIG. 4B) than the second valve 130 in FIG. 6A. Thus, during the compression stroke (see FIG. 2) of the hydraulic shock absorber 100, the second valve 33 provides a larger channel area for oil, resulting in the increased fluidity of the oil.

As shown in FIG. 6B, the second valve 230 in the comparative example includes the plurality of through-holes, the first through-hole 233A, the second through-hole 233B, and the third through-hole 233C formed therein. The first through-hole 233A, the second through-hole 233B, and the third through-hole 233C are circular-arc-shaped slots and have different circumferential lengths (different opening areas) as is the case with the second valve 33. However, unlike in the case of the second valve 33, the four corners of the first through-hole 233A, that is, the first corner portion C21, the second corner portion C22, the third corner portion C23, and the fourth corner portion C24 have an equal radius of curvature.

Here, it has been found that when the second valve 230 in the comparative example is used, stress generated in the corner portions of the second valve 230 during the tension stroke (see FIG. 3) of the hydraulic shock absorber 100 decreases in the following order: the first corner portion C21, the second corner portion C22, the third corner portion C23, and the fourth corner portion C24.

That is, in the radially outward corner portions, the corer portion closer to the second through-hole 233B in the circumferential direction is exposed to higher stress than the corner portion closer to the third through-hole 233C. Specifically, the first corner portion C21 is exposed to higher stress than the second corner portion C22. Furthermore, in the radially inward corner portions, the corer portion closer to the third through-hole 33C in the circumferential direction is exposed to higher stress than the corner portion closer to the second through-hole 33B. Specifically, the third corner portion C3 is exposed to higher stress than the fourth corner portion C4. Additionally, the radially outward corner portions are subjected to higher stress than the radially outward corner portions. Specifically, the first corner portion C21 is exposed to higher stress than the fourth corner portion C24. The second corner portion C22 is exposed to higher stress than the third corner portion C23.

This is expected to be due to the following operation.

That is, the area with the second through-hole 233B with the larger circumferential length formed therein (see arrow b2) has lower stiffness than the area with the third through-hole 233C with the smaller circumferential length formed therein (see arrow c2). Thus, when the second valve 230 is pushed by oil, the area with the second through-hole 233B formed therein (see arrow b2) is different from the area with the third through-hole 233C formed therein (see arrow c2) in the amount by which the area is deflected (the distance that the area is separated from the valve body 31). Thus, the circumferentially opposite ends of the first through-hole 233A are different from each other in the amount of deflection.

Moreover, when pushed by oil flowing through the second oil passage 312 to the first oil chamber Y1 (see FIG. 3), the areas of the second valve 230 are deflected in order from the radially outward area toward the radially inward area. Thus, the opposite ends of the first through-hole 233A in the radial direction of the second valve 230 are different from each other in the amount of deflection.

In addition, since the areas of the second valve 230 are in order from the radially outward area toward the radially inward area, the amount of deflection of the radially inward corner portions varies depending on the state of the radially outward corner portions. Specifically, if the circumferentially opposite ends of the first through-hole 233A are similarly deflected, the corner portion (fourth corner portion C24) positioned radially inward of one (first corner portion C21) of the two radially outward corner portions (first corner portion C21 and second corner portion C22) which is more significantly deflected is expected to be deflected less significantly than the corner portion (third corner portion C23) positioned radially inward of the less significantly corner portion (second corner portion C22) of the two radially outward corner portions.

As described above, the amount of deflection of the corner portion and the stress on the corner portion decrease in the following order: the first corner portion C21, the second corner portion C22, the third corner portion C23, and the fourth corner portion C24.

The second valve 33 according to the present embodiment is different from the second valve 230 in the comparative example in that the radius of the curvature of the corner portion decreases in the following order: the first corner portion C1, the second corner portion C2, the third corner portion C3, and the fourth corner portion C4. This suppresses a variation in the amount of stress among the first corner portion C1, the second corner portion C2, the third corner portion C3, and the fourth corner portion C4.

The illustrated example has been found to generate equal stress in all of the first corner portion C1, the second corner portion C2, the third corner portion C3, and the fourth corner portion C4 during the tension stroke (see FIG. 3) of the hydraulic shock absorber 100. Possible stress in the first corner portion C1 in the second valve 33 is lower than possible stress in the first corner portion C21 in the second valve 230.

As described above, the present embodiment varies the radius of curvature among the corner portions of the first through-hole 33A to increase the stiffness of the corner portions of the first through-hole 33A, thus reducing the maximum value for possible stress in the second valve 33.

Here, the second valve 33 is subjected to more broadly distributed stress than the second valve 230 in the comparative example and thus has improved durability. For example, when the ratio of the radius of curvature among the first corner portion C1, the second corner portion C2, the third corner portion C3, and the fourth corner portion C4 is 1:0.85:0.5:0.35, the maximum stress value for the second valve 33 decreases by about 20% compared to the maximum stress value for the second valve 230 in the comparative example in which the radius of curvature does not vary.

Moreover, the second valve 33 may be considered to be as follows. The second valve 33 is shaped to prevent a possible increase in stress and thus has higher durability than the second valve 230 in the comparative example, while maintaining damping characteristics so that the second valve 33 is deflected (opened) at lower pressure similarly to the second valve 230 in the comparative example. In addition, the second valve 33 can be made difficult to break in the corner portions where stress concentrates.

Moreover, the present embodiment may be considered to vary the radius of curvature among the corner portions of the second valve 33 where high stress is likely to occur, depending on the possible stress.

Furthermore, as shown in FIG. 5A, the present embodiment may be considered to be as follows. If the second valve 33 has a low-stiffness side (one side, the second through-hole 33B side) and a high-stiffness side (another side, the third through-hole 33C side) with respect to a virtual center line IL connecting the circumferential midpoint (circumferential center) CC of the first through-hole 33A with the central axis CL of the second valve 33, the end portion (corner portions) of the first through-hole 33A positioned on the lower-stiffness side has a larger radius of curvature (higher stiffness) than the end portion (corner portions) of the first through-hole 33A positioned on the higher-stiffness side.

Although not described above, the radially outward corner portions of each of the second through-hole 33B and third through-hole 33C of the second valve 33 shown in FIG. 5 have a larger radius of curvature than the radially inward end portion of each of the second through-hole 33B and third through-hole 33C. This enables distribution of stress occurring radially outside each of the second through-hole 33B and third through-hole 33C Of course, possible stress in the second through-hole 33B and the third through-hole 33C may be distributed by varying the radius of curvature among the corner portions of the through-hole depending on the circumferential stiffness of the second valve 33 as in the case of the first through-hole 33A.

As described above, the stiffness of the corner portions of each of the first through-hole 33A, the second through-hole 33B, and the third through-hole 33C is adjusted by controlling the radii of curvature of the corner portions. However, a configuration in which the thickness, material, or the like of the second valve 33 is adjusted around each of the first through-hole 33A, the second through-hole 33B, and the third through-hole 33C may be used as long as the stiffness is varied among the corner portions.

Furthermore, as described above, the circumferential stiffness of the second valve 33 is made nonuniform by forming a plurality of through-holes with different circumferential lengths. However, for example, the following configuration may be used as long as the circumferential stiffness of the second valve 33 is nonuniform: a configuration in which a plurality of through-holes with different radial lengths (widths) are formed in the circumferential direction, a configuration in which a plurality of connection portions 33F with different circumferential lengths are formed, a configuration in which the thickness or material of the second valve is varied in the circumferential direction, or a combination thereof.

Additionally, the second valve 33 provided in the first valve apparatus 30 has been described above. However, the above-described configuration is applicable provided that the valve has circumferentially nonuniform stiffness. The above-described configuration is of course applicable to another valve, for example, the first valve 32 of the first valve apparatus 30 or the first valve 42 or second valve 43 of the second valve apparatus 40.

EXPLANATION OF REFERENCE NUMERALS

10 Cylinder
11 Outer cylinder
12 Inner cylinder
22 Piston rod
25 Rod guide
30 First valve apparatus
33 Second valve
33A First through-hole
33B Second through-hole
33C Third through-hole
100 Hydraulic shock absorber
C1 First corner portion
C2 Second corner portion
C3 Third corner portion
C4 Fourth corner portion

What is claimed is:

1. A hydraulic shock absorber comprising:
a partitioning member which partitions a closed space and has a passage through which the closed space is continuous with an outside; and
a valve which is a member fixed to the partitioning member on a central side of the valve and covering an open end of the passage in the partitioning member, the valve being deformable in a direction away from the partitioning member when the valve is applied with force from the partitioning member side, and the valve being configured to have a through-hole formed in a circumferential direction thereof,
wherein the through-hole in the valve comprises a first corner portion, a second corner portion, a third corner portion, and a fourth corner portion, the first corner portion being positioned radially outward of a center of the through-hole and on a first end side in the circumferential direction, the second corner portion being positioned radially outward of the center of the through-hole and on a second end side in the circumferential direction, the third corner portion being positioned radially inward of the center of the through-hole and on the second end side in the circumferential direction, the fourth corner portion being positioned radially inward of the center of the through-hole and on the first end side in the circumferential direction, and the first corner portion and the second corner portion each consist of a respective radius of curvature that is larger than a respective radius of curvature of each of the third corner portion and the fourth corner portion, wherein the first and second corner portions define an outer edge of the through-hole in the circumferential direction.

2. A valve which is a member fixed on a central side thereof to a partitioning member which partitions a closed space and has a passage through which the closed space is continuous with an outside, the valve being configured to cover an open end of the passage in the partitioning member and being deformable in a direction away from the partitioning member when the valve is applied with force from the partitioning member side, and the valve being configured to have a through-hole formed in a circumferential direction thereof wherein the through-hole in the valve comprises a first corner portion, a second corner portion, a third corner portion, and a fourth corner portion, the first corner portion being positioned radially outward of a center of the through-hole and on a first end side in the circumferential direction, the second corner portion being positioned radially outward of the center of the through-hole and on a second end side in the circumferential direction, the third corner portion being positioned radially inward of the center of the through-hole and on the second end side in the circumferential direction, the fourth corner portion being positioned radially inward of the center of the through-hole and on the first end side in the circumferential direction, and the first corner portion and the second corner portion each consist of a respective radius of curvature that is larger than a respective radius of curvature of each of the third corner portion and the fourth corner portion, wherein the first and second corner portions define an outer edge of the through-hole in the circumferential direction.

3. The hydraulic shock absorber according to claim 1, wherein the valve comprises a first slot and a second slot each formed in the circumferential direction, the first slot being positioned on one side relative to a virtual center line connecting a circumferential center of the through-hole with a central axis of the valve, the one side being where the first corner portion and the fourth corner portion are formed, the second slot being positioned on another side relative to the virtual center line, the another side being where the second corner portion and the third corner portion are formed, the second slot having a smaller circumferential length than the first slot.

4. The hydraulic shock absorber according to claim 1, wherein radii of curvature of the first corner portion, the second corner portion, the third corner portion, and the fourth corner portion decrease in this order.

* * * * *